United States Patent [19]

Baumoel

[11] 4,333,353

[45] Jun. 8, 1982

[54] TWO-TRANSDUCER DOPPLER FLOWMETER WITH SWEPT OSCILLATOR

[76] Inventor: Joseph Baumoel, 107 Columbia Dr., Jericho, Long Island, N.Y. 11753

[21] Appl. No.: 173,012

[22] Filed: Jul. 28, 1980

[51] Int. Cl.$^3$ .............................................. G01F 1/66
[52] U.S. Cl. .................................. 73/861.25; 128/663
[58] Field of Search ........... 73/861.25, 861.26, 861.41; 128/663

[56] References Cited

U.S. PATENT DOCUMENTS 4,147,059 4/1979 Fathauer ......................... 73/861.25

OTHER PUBLICATIONS

K. McCarty et al., "Frequency Modulated Ultrasonic Doppler Flowmeter," *Medical and Biological Engineering*, vol. 13, No. 1, pp. 59-64, Jan. 1975.

*Primary Examiner*—Stephen A. Kreitman
*Attorney, Agent, or Firm*—Ostrolenk, Faber, Gerb & Soffen

[57] ABSTRACT

A flowmeter clamped onto the outside of a conduit uses doppler techniques for measuring the flow velocity of a fluid within the conduit. Separated transmitter and receiver transducers are connected to different locations on the conduit. An oscillator connected to the transmit crystal causes the crystal to produce a continuous high frequency output wave which is injected through the pipe wall and into the fluid. The frequency of the transmit oscillator is cyclically swept through a given frequency range. The receiver transducer receives reflected sonic signals from particles moving with the fluid whose velocity is to be measured. The receiver crystal also receives, through the pipe wall, the transmitted wave form. The transmitted signal and received signal are added together to produce an amplitude-modulated envelope having a beat frequency related to the flow velocity of particles producing the reflected signal received by the receiving crystal. By using frequency sweep or dither, the effect of standing waves at the receiving crystal is eliminated since, during the sweep cycle, at least one transmitter signal amplitude will be present to produce an optimum beat frequency output when added to the reflected signal. The measured amplitude-modulated wave is applied to an amplitude demodulator which, in turn, is connected to a flow indicator. Means are provided to control the amplitude of the transmit signal which is added to the receive signal to prevent the receive signal from overwhelming the pipe conducted transmit signal in the summation process producing the beat frequency.

10 Claims, 6 Drawing Figures

TWO-TRANSDUCER DOPPLER FLOWMETER WITH SWEPT OSCILLATOR

BACKGROUND OF THE INVENTION

This invention relates to flowmeters, and more particularly relates to flowmeters using doppler principles for their operation.

The use of doppler principles for flowmeters is well known. In one well-known system, which is commercially used, a transmitter transducer crystal and receiver transducer crystal are contained in a common housing which is connected to a conduit which carries fluid. The transmitter crystal produces a continuous wave output at a single stable high frequency. The continuous wave sonic signal is injected through the wall of the conduit and into the fluid. If the fluid being monitored contains particles having a size greater than about 1/10th the wavelength of the sonic frequency used to make the measurement, a sonic wave will be reflected from the particles and received by the receiver transducer crystal. If the particle is moving relative to the receiver transducer, the frequency of the received wave will be doppler-shifted from the frequency of the transmitted wave. The doppler shift is proportional to the velocity of the reflecting particle and thus to the velocity of the fluid. This velocity is then indicated.

The single transducer system described above has a shortcoming in that the transmit signal applied to the receiver generally predominates over the particle-reflected signal. The beat frequency amplitude modulation then becomes too low to be reliably measured. This loss of modulation is especially prevalent in cases of low reflected signal amplitude.

In an attempt to avoid the problems inherent in the single transducer housing arrangement, the transmit and receive transducers have been separately housed and mounted at spaced locations on the conduit containing the fluid to be monitored. Since the receive transducer must receive some of the transmit signal in order to produce the beat frequency, the transmit signal was derived directly from the conduit wall. However, since the transducers are physically separated, it is possible to adjust the ratio of transmit signal to receive signal received by the receive transducer to keep their relative amplitudes equalized. The transmit signal and receive signal are then added in the receive transducer in the usual manner to produce an amplitude-modulated beat frequency which is demodulated to produce an indication of flow.

In using the above systems, the devices will frequently work well for a period of time and then unexpectedly will work poorly for a period of time. These problems are frequently attributed to mechanical defects or circuit defects.

BRIEF DESCRIPTION OF THE INVENTION

I have recognized that a major cause of failure of doppler-type flowmeters which are clamped to the outside surface of a conduit is the existence of a standing wave produced by reflection of the transmit energy which propagates along the conduit wall from a discontinuity such as an end surface of the conduit. This standing wave will vary in location along the conduit from time to time depending upon such parameters as transducer frequency, the location of the transducers on the pipe and relative to one another and relative to ultimate sonic reflectors such as pipe joints and the like; the sonic velocity of the pipe and the sonic velocity in the fluid being measured. Some of these factors are, in turn, related to pipe and fluid temperature and the like. Thus, a slight temperature change can place the node (or the minimum amplitude location) of the standing wave at or near the receive transducer. The amount of transmit signal which the receiver transducer receives will then be reduced or increased to such a value that it will not produce a measurable beat frequency amplitude with the reflected signal return.

However, if temperatures should again change, only slightly, of if some other parameter should change, such as the nature of the fluid being monitored or the like, the position of the node (or peak) will shift and an appropriate amount of transmit signal will be received at the receive transducer to produce a satisfactory amplitude-modulated beat frequency which can be easily measured. For the reason of the shifting standing wave, doppler-measuring flowmeters exhibit erratic behavior.

In accordance with the invention and to eliminate the adverse affects of standing waves in a doppler measuring flowmeter-type system, the transmitter frequency is cyclically swept over a limited frequency range so that the standing wave node or nodes, which might be produced at or near the receiver location, are rapidly swept along the longitudinal axis of the pipe at a relatively high frequency. This relatively high frequency is a frequency which is high relative to the highest beat frequency which is expected to be produced by the system when working normally.

The sweeping or dithering of the transmitter frequency can, in one embodiment, consist of a change of the transmitter frequency over a range of 100 kilohertz at a cyclic frequency of about 50 kilohertz. Thus, the transmitter frequency, which may have a center frequency of 1 megahertz, will sweep between a frequency of 950,000 hertz to 1,050,000 hertz 50,000 times each second. Note, however, that the transmitter frequency can range from a center frequency of 600 to 1500 kilohertz, the sweep range can be from 10 to 150 kilohertz, and the cyclic frequency of the sweep can be from 40 to 100 kilohertz, as desired by the designer.

The amplitude-modulated signal, which is produced by beating together the dithered transmitter signal and correspondingly dithered received signal, will produce a beat frequency which is itself dithered. The dithered beat frequency will contain, in each period, points of very low amplitude corresponding to frequencies which would place the node or peak of the standing wave close to or at the receiver transducer and points of amplitude which correspond to frequencies at which the standing wave has an amplitude at the receiver location corresponding to the amplitude of the received or reflected signal from moving particles.

The envelope of the beat frequency can then be measured from the peak in each period of the sweep frequency, thereby to consistently reproduce the beat frequency produced by the difference between the transmit and receive signals independently of effects of the standing wave which previously caused wide variations in results of given doppler-measuring instruments for flowmeters.

The novel invention also makes it possible to mount the transmitter and receiver housings at any location convenient to the user. Moreover, the system makes it possible to effectively control the percentage modulation produced by controlling the amount of transmitter oscillator signal which is added to the signal output of the received signal. Thus, it has been found that if the amount of received signal, which is added to the transmit signal, is too great, modulation can approach 100%, causing difficulty measuring high velocity flow. Suitable circuits are provided to measure the percentage modulation and to adjust the amount of transmit signal which can be injected into the received signal from the pipe or from outside circuitry in order to limit modulation to an optimum 50%.

The transducer structure can be built in any desired manner. However, transducers of the type disclosed in my copending application Ser. No. 146,530, filed May 5, 1980, entitled TRANSDUCER STRUCTURE AND MOUNTING ARRANGEMENT FOR TRANSDUCER STRUCTURE FOR CLAMP-ON ULTRASONIC FLOWMETERS can be employed as the transducers for the doppler system of the present invention. The angle of the crystal surface in the receive and transmit transducers can be changed from that shown in the above application and is preferably 30° to the pipe axis, but can be in the range of 25° to 45°, dependent on pipe material.

The disclosure of the above-noted application is incorporated herein by reference and shows a novel easily mounted transducer arrangement which effectively couples energy into and out of a fluid flowing in the interior of the conduit.

DETAILED DESCRIPTION OF THE DRAWINGS

Figure 1:
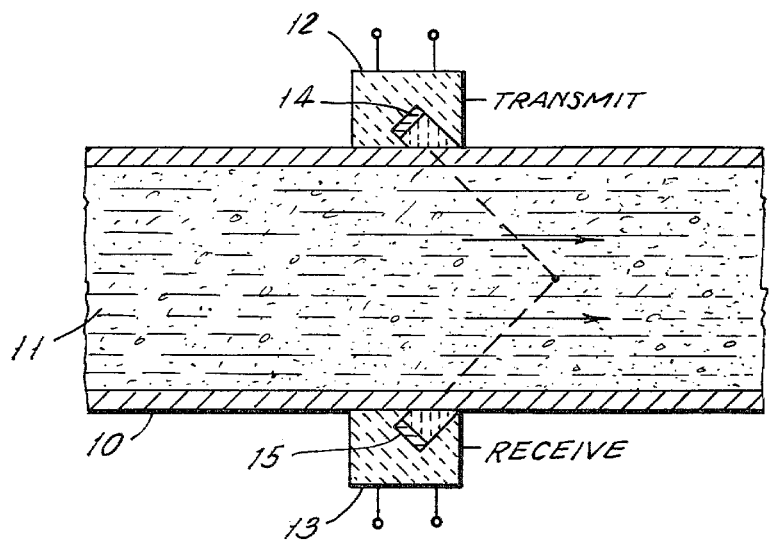
FIG. 1 schematically illustrates in cross-section spaced transmit and receive transducers mounted at different locations on a fluid-carrying conduit.

Referring first to FIG. 1, there is illustrated a conduit 10 which carries a fluid 11 which may contain particulates having the ability to reflect a sonic wave and which flow with the fluid. The conduit 10 can be of any desired material but is preferably one which transmits a sonic wave without undue attenuation. The fluid 11 may be any desired sonically conductive fluid. Whatever the fluid, if the fluid contains particles such as solid objects, gas bubbles or other objects exhibiting a sonic wave reflecting surface, and the particles flow at the rate of the fluid, a doppler-type system can be used to determine the velocity or flow rate of the fluid.

Spaced transducer devices 12 and 13 are secured to selected surfaces of the exterior of the conduit and contain transducer crystals 14 and 15, respectively, which can be any desired type of well-known transducer crystal.

The transducer structure can be secured to the exterior of the conduit in any desired manner. The transducer structure and its supports may take the form generally shown in copending application Ser. No. 146,530, in the name of Joseph Baumoel, entitled TRANSDUCER STRUCTURE AND MOUNTING ARRANGEMENT FOR TRANSDUCER STRUCTURE FOR CLAMP-ON ULTRASONIC FLOWMETERS which is incorporated into the present application by reference. While the transducer structure of the above-noted application discloses preferred materials and mounting arrangements, any type of transducer including those presently commonly used in doppler systems could be used to carry out the present invention.

The transmit transducer 14 is electrically energizable as will be later described to produce a high frequency continuous ultrasonic wave which is applied to the outer conduit 10 and is then injected into the fluid moving through the interior of the conduit 10. While a wide range of frequencies could be selected for the transmit signal, the invention has been carried out successfully using a transmit continuous wave form having a center frequency of about 1 megahertz. As will be later described and in accordance with the invention, this frequency is swept, or has a dither applied thereto which is a dither of about 100 kilohertz which rises and falls linearly at a repetition frequency of about 50 kilohertz. The 100 kilohertz dither will cause the 1 megahertz carrier to vary from 950,000 hertz to 1,050,000 hertz during each period.

It should be noted that the dither frequency and the cyclic or repetitive frequency of the sweep or dither are not critical and other frequencies can be used.

The continuous wave ultrasonic signal produced by crystal 14 of transmit transducer 12 injects a transmit signal into the fluid 11. As is conventional in doppler systems, this signal will be reflected by moving particles or sonic discontinuities, particularly by those having a size greater than about 1/10 the wavelength of the impinging ultrasonic energy.

The reflected ultrasonic energy is then received by the receiving transducer 13 and by its crystal 15. The frequency of the return signal will be either higher or lower than the transmit frequency by a factor related to the velocity of the reflecting particle and the direction in which it moves. For example, if the particle is moving away from the receiver 13, the reflected signal frequency will be lower than the transmitted frequency in view of the doppler shift, and the reduction in frequency will be related to the velocity of the particle and thus the velocity of the fluid 11. If the particle, however, is moving toward the receiving crystal, the frequency of the reflected signal will be higher than the transmit frequency, again by a value related to the velocity of the particles.

The actual change in frequency of the reflected signal is conventionally measured by adding the reflected or received signal to the transmit signal in order to produce a beat frequency which will have a period related to the frequency difference between the two signals. The combined signal is an amplitude-modulated signal and the beat frequency can be measured by conventional amplitude demodulation circuits.

In accordance with the invention, the receive signal will be dithered proportionally to the transmit signal so that the beat frequency produced by adding the two signals, as later described, will eliminate the adverse affects of a standing wave on the conduit 10.

Figure 2:
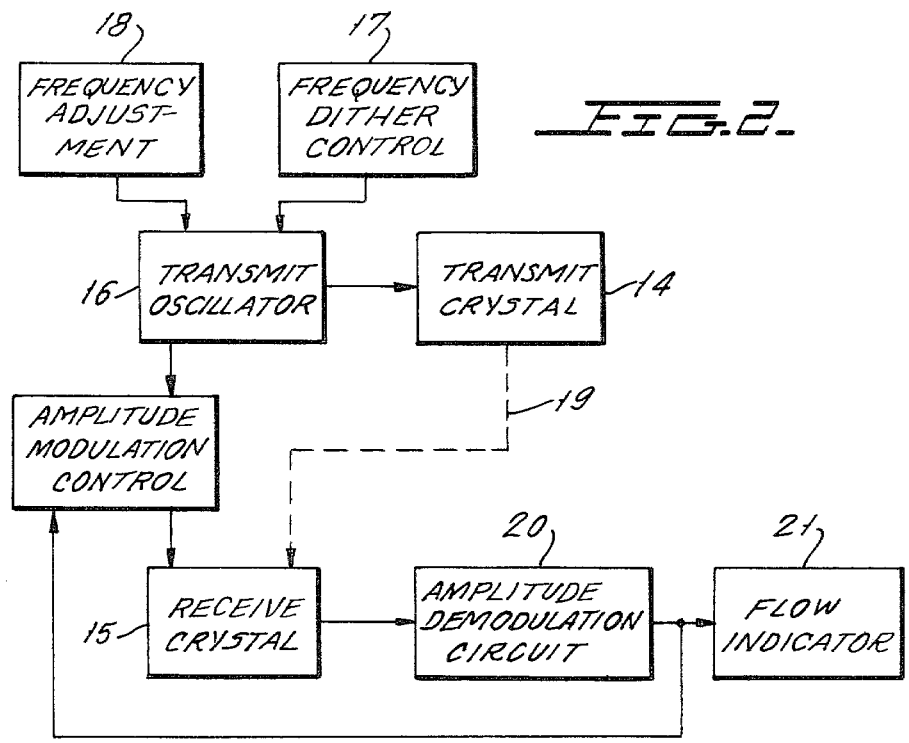
FIG. 2 is a block diagram of one circuit using the present invention.

FIG. 2 is a schematic block diagram of the novel system of the invention. In FIG. 2, there is schematically illustrated the transmit crystal 14 and receive crystal 15 which were described in FIG. 1. As further shown in FIG. 2, a transmit oscillator 16 is connected to the transmit crystal 14 and typically would apply thereto an average frequency of about 1 megahertz. This transmit frequency, however, is caused to vary in a cyclic manner by the frequency dither control circuit 17 which, typically, causes the transmit frequency to vary by about 100 kilohertz at a frequency at about 50 kilohertz. The transmit oscillator 16 may also have connected thereto a frequency adjustment circuit 18 of conventional form to adjust the center frequency of the transmit oscillator. Thus, it is frequently desired to adjust or time the transmit oscillator frequency to permit the system to work best in connection with fixed parameters. The frequency adjustment 18 is used for that purpose.

The output of receive crystal 15 is coupled to the transmit crystal 14 as shown by the dotted line 19 through the pipe wall 10. The receive crystal 15 will receive an input signal from the fluid (not shown in FIG. 2). The output voltage of the receive crystal 15 will be the combined signal of the energy received from moving particles in the conduit 10 and from a portion of the signal of the transmit crystal 19 which is transmitted through the wall of conduit 10. Thus, the output of the receive crystal 15 will be an amplitude-modulated wave having a frequency which is the average frequency of the transmit signal frequency and the return signal frequency will have an amplitude-modulated beat frequency whose period is related to the difference in the frequencies of the transmit and receive signals. These signals are shown partly in FIGS. 3, 4 and 5.

Figure 3:
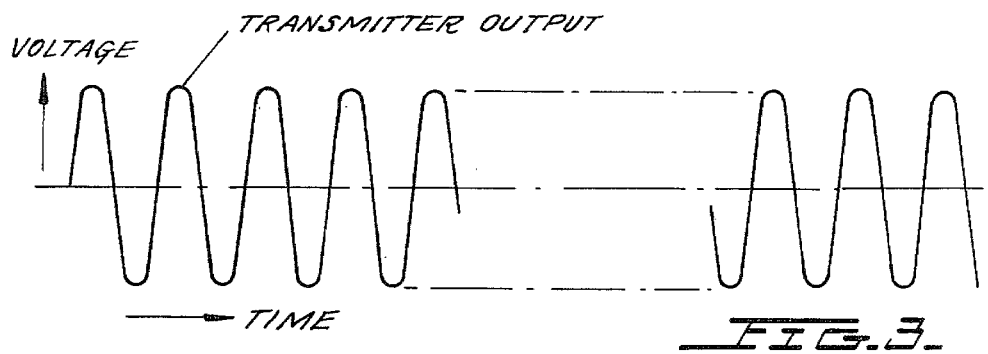
FIG. 3 shows the wave shape of the transmitter output in the block diagram of FIG. 2.

Referring first to FIG. 3, there is shown the transmitter output frequency which can, for example, be 1 megahertz. In FIG. 3, the number of cycles shown are too small to show the change in frequency due to a frequency sweep. The transmitter signal portion which is applied through the pipe wall to the receive crystal 15 in FIG. 2 will also have the form shown in FIG. 3.

The receive signal input reflected from a particle will have, in the embodiment described, a lower frequency than the transmitter frequency since the particles reflecting ultrasonic energy are moving away from the receiver in FIG. 1. Thus, the received signal input will have the form shown in FIG. 4 which is a lower frequency than the transmit signal.

Figure 4:
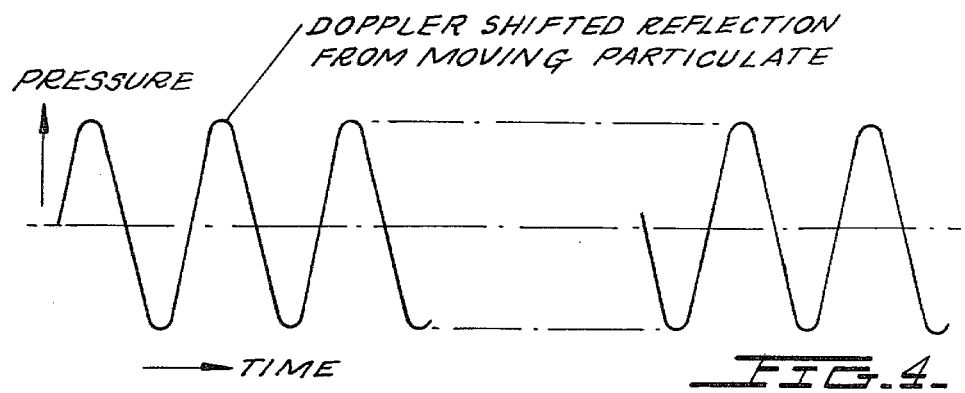
FIG. 4 shows the wave shape of the actual doppler shifted signal reflected from moving particulate.

As described, a portion of the transmitter energy is coupled through the wall of the pipe 10 to the receive crystal 15 where it is combined with the received signal input of FIG. 4. The system should be designed so that the signal amplitude at at least one frequency in the sweep band of the transmitter signal received by receive transmitter crystal 15 and the signal received from the fluid are approximately equal. This control is affected by the amplitude modulation control structure labeled in FIG. 2.

Figure 5:
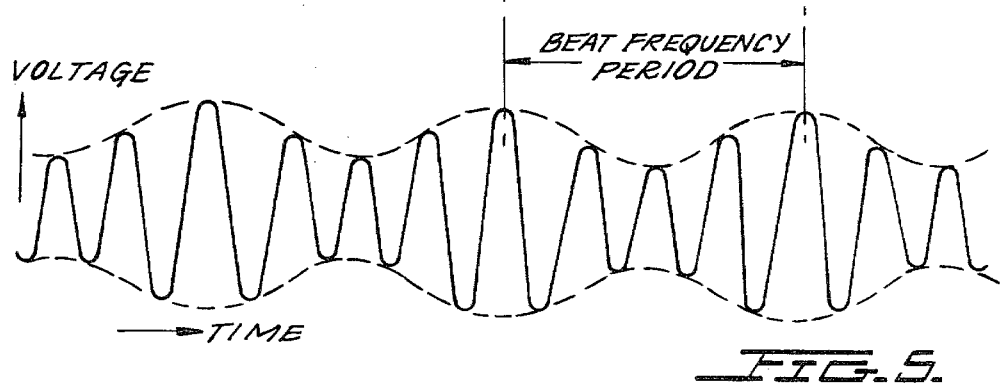
FIG. 5 shows the typical beat frequency pattern which is produced by the addition of a fixed transmitter frequency and a different doppler shifted receive frequency.

The combined signals will then produce the beat frequency output wave form having the ideal form, ignoring the affect of standing waves shown in FIG. 5, where the beat frequency will be related to the velocity of the particles in the fluid 10. This beat frequency is then measured by use of a suitable amplitude demodulation circuit 20 shown in FIG. 2, which in turn will activate a suitable flow indicator 21.

As previously described, when using a highly stable transmit oscillator, doppler meters have produced very uncertain and unrepeatable results. This is believed to be caused by the presence of standing waves which are produced by energy which is reflected from the pipe ends or pipe junctions in the conduit 10. The reflected pipe signal recombines with the forward-going wave from the transmit transducer 12 to produce a standing wave along the pipe having a particular amplitude at the receive transducer 13. The location of these standing waves will vary with numerous uncontrolled parameters including the nature of the fluid 11 and temperature. Consequently, with slight temperature shifts or slight shifts in the sonic velocity of the fluid 11 or of the pipe wall 10, the position of the standing wave, which permitted a sufficiently high transmit signal component at the receive transducer 13 at one time, will be insufficient or too great at another time to produce a measurable beat frequency. This change in location of the standing wave will then show up as a wild variation in flow velocity or as a meter fault when the fluid velocity may not have changed at all. Similarly, if the amplitude of the reflected signal changes because, for example, of a change in fluid properties, the amplitude of the transmit signal which gave good operation may no longer be sufficient to produce a measurable beat frequency amplitude.

In accordance with the invention, an recognizing the problem created by standing waves, the transmit frequency of the transmit oscillator 16 is intentionally varied at a rate which is high relative to the beat frequency range which is expected in the application. This frequency variation or dither has a frequency range which ensures, in a given application, that the standing waves produced will be moved through a sufficiently wide range to provide at least one point during the dither period at which the standing wave will be at an optimum for the beat frequency measurement.

Figure 6:
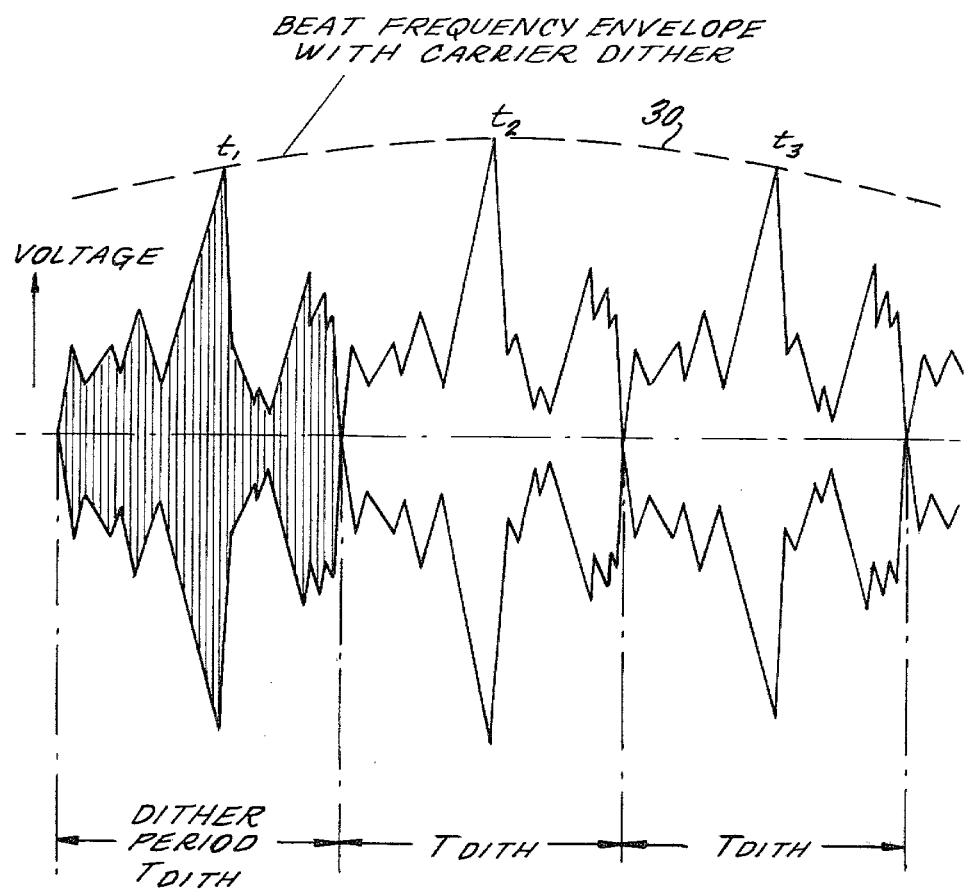
FIG. 6 shows the envelope of the beat frequency output in FIG. 2 when using a swept or dithered carrier signal and illustrates sharp peaks and values in the beat frequency output due to standing wave effects.

FIG. 6 illustrates a portion of the period of the beat frequency produced in the output of received crystal 15 when using carrier dither. Thus, in FIG. 6, the transmitter frequency is varied systematically between 950,000 hertz and 1,050,000 hertz at a dither frequency of 50,000 hertz. This ensures at least 10 dither periods at the highest expected beat frequency which typically would be about 5000 hertz.

FIG. 6 illustrates three dither periods where, within each period, there are similar patterns of relatively high and relatively low output depending upon the location of the standing waves at a particular instantaneous frequency within the sweep range. In each case, at times t1, t2 and t3 in the three dither groups illustrated there is a peak in the group since this was the most efficient measurement frequency under the conditions at the time the particular measurement was made. By measuring the peak of each of the dither periods, the beat frequency envelope 30 in FIG. 6 can be determined and the beat frequency can be measured by the amplitude demodulation circuit 20 of FIG. 2.

When conditions change in the fluid being monitored or external temperature or the like, a different portion of each dither period may produce the peak, but the envelope 30 will be the same and the proper beat frequency can be produced and measured. This measurement is independent of a single particular location of the standing wave or a change in reflected signal amplitude which has, in the past, prevented doppler flowmeters from reaching their full potential.

In the above, it was assumed that a limiting factor in the application is a standing wave pattern. However, it is possible that a doppler meter may work erratically, even in the absence of a standing wave, but the meter will produce the maximum output only at one frequency in a range of frequencies because of other factors. The use of the present invention will ensure that the beat frequency is automatically used to produce a peak in each repetitive sweep cycle corresponding to a maximum beat frequency amplitude output to enable the creation of the beat frequency envelope from these individual peaks. Thus, the invention has wide application to all types of doppler-measuring systems including those which are inserted directly in a fluid being monitored wherein the receive crystal is not located in a standing wave region.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A doppler flowmeter measuring system for measuring the flow of a fluid in a conduit comprising:

first transducer means connected to a first portion of said conduit and operable for injecting ultrasonic energy into said fluid;

second transducer means separate from said first transducer means and connected to a second portion of said conduit and operable for receiving ultrasonic energy injected into said fluid by said first transducer means and reflected by energy reflecting objects in said fluid;

a high frequency generator connected to said first transducer means for causing said first transducer means to inject ultrasonic energy into said fluid with a wave form at least generally following the wave form of the output of said high frequency generator;

means coupling a portion of the output ultrasonic energy of said first transducer means directly to said second transducer means, whereby the output of said second transducer means is a wave form which is the summation of the wave form of ultrasonic energy received directly from said first transducer means and the ultrasonic energy reflected from reflecting objects in said fluid;

amplitude demodulation means connected to said second transducer means for demodulating the beat frequency content in the ouptut of said second transducer means and for producing an output signal related to said beat frequency;

said wave form of ultrasonic energy injected into said fluid by said first transducer means containing a relatively low frequency cyclic dither; said relatively low frequency cyclic dither having a cyclic frequency which is relatively high in comparison to the highest beat frequency which is to be produced by said measuring system; and means for modulating the ratio of the amplitudes of the signals received by said second transducer means from said energy reflecting objects and directly from said first transducer means respectively.

2. A doppler flowmeter measuring system for measuring the flow of a fluid in a conduit comprising:

first transducer means connected to a first portion of said conduit and operable for injecting ultrasonic energy into said fluid;

second transducer means separate from said first transducer means and connected to a second portion of said conduit and operable for receiving ultrasonic energy injected into said fluid by said first transducer means and reflected by energy reflecting objects in said fluid;

a high frequency generator connected to said first transducer means for causing said first transducer means to inject ultrasonic energy into said fluid with a wave form at least generally following the wave form of the output of said high frequency generator;

means coupling a portion of the output ultrasonic energy of said first transducer means directly to said second transducer means, whereby the output of said second transducer means is a wave form which is the summation of the wave form of ultrasonic energy received directly from said first transducer means and the ultrasonic energy reflected from reflecting objects in said fluid;

amplitude demodulation means connected to said second transducer means for demodulating the beat frequency content in the output of said second transducer means and for producing an output signal related to said beat frequency;

said wave form of ultrasonic energy injected into said fluid by said first transducer means containing a relatively low frequency cyclic dither; said relatively low frequency cyclic dither having a cyclic frequency which is relatively high in comparison to the highest beat frequency which is to be produced by said measuring system;

said high frequency generator having a continuous output wave form of constant amplitude in a frequency range of from 600 kilohertz to 1500 kilohertz; said frequency dither superimposed on said continuous wave form at a frequency which varies continuously in a range up to about 25% of the frequency of said continuous output wave form; said frequency dither having a repetition rate of greater than about 10 times the highest expected beat frequency to be measured by said system.

3. The system of claim 1 or 2 wherein said high frequency generator produces a continuous wave output.

4. The system of claim 3 wherein said first and second transducer means are clamped to the outer surface of said conduit; said conduit comprising an elongated hollow pipe having at least one axial discontinuity which reflects ultrasonic energy injected into the wall of said conduit by said first transducer means, thereby to create a standing wave in the region of said second transducer means; said standing wave being cyclically axially displaced relative to said location of said second transducer means at the cycle frequency of said dither to ensure at least one given amplitude of energy from said first transducer means at said region of said second transducer means during each cycle of the cycle frequency of said dither, whereby an easily measured beat frequency can be produced by said second transducer means and demodulated by said demodulation means, regardless of the presence of a standing wave on said conduit.

5. The system of claim 1 or 2 wherein said means coupling a portion of said energy of said first transducer means to said second transducer means at least partly includes the wall of said conduit.

6. The system of claim 5 wherein said first and second transducer means are clamped to the outer surface of said conduit; said conduit comprising an elongated hollow pipe having at least one axial discontinuity which reflects ultrasonic energy injected into the wall of said conduit by said first transducer means, thereby to create a standing wave in the region of said second transducer means; said standing wave being cyclically axially displaced relative to said location of said second transducer means at the cycle frequency of said dither to ensure at least one given amplitude of energy from said first transducer means at said region of said second transducer means during each cycle of the cycle frequency of said dither, whereby an easily measured beat frequency can be produced by said second transducer means and demodulated by said demodulation means, regardless of the presence of a standing wave on said conduit.

7. The system of claim 2 wherein said highest beat frequency to be measured by said system is about 5 kilohertz.

8. The system of claim 1, 7 or 2 wherein said first and second transducer means are clamped to the outer surface of said conduit; said conduit comprising an elongated hollow pipe having at least one axial discontinuity which reflects ultrasonic energy injected into the wall of said conduit by said first transducer means, thereby to create a standing wave in the region of said second transducer means; said standing wave being cyclically axially displaced relative to said location of said second transducer means at the cycle frequency of said dither to ensure at least one given amplitude of energy from said first transducer means at said region of said second transducer means during each cycle of the cycle frequency of said dither, whereby an easily measured beat frequency can be produced by said second transducer means and demodulated by said demodulation means, regardless of the presence of a standing wave on said conduit.

9. A flowmeter using doppler measurement techniques and employing a transmitting transducer and a receiving transducer which are coupled to the exterior of a fluid carrying conduit; said receiving transducer being located to receive ultrasonic energy from said transmitting transducer through the wall of said conduit and to receive ultrasonic energy reflected from particles in the fluid carried by said conduit; said receiving transducer connected to demodulating and indicating circuit means for measuring the beat frequency output of said receiving transducer and displaying said output as a function of the flow velocity of the fluid within said conduit; and a transmitter oscillator means connected to said transmitting transducer, said transmitter oscillator means having a continuous wave output which has a superimposed dither frequency which varies over a given cycle at a given cycle rate, whereby the effects of standing waves on the flow measurement are eliminated; said transmitter oscillator means having a continuous output wave form of constant amplitude in a frequency range of from 600 kilohertz to 1500 kilohertz; said superimposed dither frequency on said continuous wave form having a frequency which varies continuously in a range up to about 25% of the frequency of said continuous output wave form; said dither frequency having a repetition rate of greater than about 10 times the highest expected beat frequency to be measured by said system.

10. The system of claim 8 wherein said highest beat frequency to be measured by said system is about 5 kilohertz.

* * * * *